(12) United States Patent
Enami et al.

(10) Patent No.: US 8,164,632 B2
(45) Date of Patent: Apr. 24, 2012

(54) METHOD AND APPARATUS FOR MEASURING MOVING PICTURE RESPONSE CURVE

(75) Inventors: Yoshi Enami, Ritto (JP); Yoshihisa Furukawa, Shiga (JP); Hiroyuki Nakamoto, Yasu (JP); Tsutomu Mizuguchi, Ritto (JP)

(73) Assignee: Otsuka Electronics Co., Ltd., Osaka (JP)

( * ) Notice: Subject to any disclaimer, the term of this patent is extended or adjusted under 35 U.S.C. 154(b) by 1458 days.

(21) Appl. No.: 11/711,122

(22) Filed: Feb. 27, 2007

(65) Prior Publication Data

US 2007/0211146 A1    Sep. 13, 2007

(30) Foreign Application Priority Data

Mar. 8, 2006    (JP) .................................. 2006-63186

(51) Int. Cl.
  *H04N 17/00* (2006.01)
  *H04N 17/02* (2006.01)
  *H04N 9/10* (2006.01)
(52) U.S. Cl. ........ 348/180; 348/184; 348/177; 348/185; 348/191
(58) Field of Classification Search .................. 348/180, 348/196, 184, 187, 185, 181, 182, 191, 177, 348/175; 345/474, 684
See application file for complete search history.

(56) References Cited

U.S. PATENT DOCUMENTS

| 6,014,258 A | 1/2000 | Naka et al. |
| 6,208,467 B1 | 3/2001 | Naka et al. |
| 6,377,232 B1 | 4/2002 | Chevet et al. |
| 6,518,977 B1 | 2/2003 | Naka et al. |
| 6,628,822 B1 | 9/2003 | Nakabayashi et al. |
| 6,831,948 B1 | 12/2004 | Van Dijk et al. |
| 6,970,148 B2 | 11/2005 | Itoh et al. |
| 7,394,483 B2 * | 7/2008 | Oka .............................. 348/181 |
| 2002/0191008 A1 | 12/2002 | Naka et al. |

(Continued)

FOREIGN PATENT DOCUMENTS

JP    11-32228    2/1999

(Continued)

OTHER PUBLICATIONS

Youichi Igarashi et al., 31.2: Proposal of the Perceptive Parameter Motion Picture Response Time (MPRT), 2003 SID International Symposium Digest of Technical Papers, Baltimore, MD. May 20-22, 2003, SID International Symposium Digest of Technical Papers, San Jose, CA: SID, US, vol. 34/2, (May 20, 2003), pp. 1039-1041, XP007008296.

(Continued)

*Primary Examiner* — Jefferey Harold
*Assistant Examiner* — Jean W Desir
(74) *Attorney, Agent, or Firm* — Finnegan, Henderson, Farabow, Garrett & Dunner, L.L.P.

(57) ABSTRACT

A picture is scrolled on a display 5 to be measured, and the scrolling moving picture is pursuit-captured by a color camera 3 so as to obtain a pursuit-captured moving picture image. A moving picture response curve using received light intensity data obtained based upon the pursuit-captured moving picture image is converted into a color moving picture response curve using emission intensity of display elements of the display 5 to be measured. The coloration of an edge part of the pursuit-captured moving picture image is decomposed into the respective color components, by which objective quantitative evaluations of color shifting can be made.

20 Claims, 8 Drawing Sheets

U.S. PATENT DOCUMENTS

| | | |
|---|---|---|
| 2004/0155893 A1 | 8/2004 | Furukawa et al. |
| 2005/0237433 A1 | 10/2005 | Van Dijk et al. |
| 2005/0259153 A1 | 11/2005 | Oka |
| 2006/0160436 A1 | 7/2006 | Oka et al. |
| 2007/0024627 A1 | 2/2007 | Oka et al. |
| 2007/0222861 A1 | 9/2007 | Enami |

FOREIGN PATENT DOCUMENTS

| | | |
|---|---|---|
| JP | 11-109916 | 4/1999 |
| JP | 11-259044 | 9/1999 |
| JP | 2001-42845 | 2/2001 |
| JP | 2001-54147 | 2/2001 |
| JP | 2001-204049 | 7/2001 |
| JP | 2001-289732 | 10/2001 |
| JP | 2002-169515 | 6/2002 |
| JP | 2002-223453 | 8/2002 |
| JP | 2002-291001 | 10/2002 |
| JP | 2002-323376 | 11/2002 |
| JP | 2003-506928 | 2/2003 |
| JP | 2004-126458 | 4/2004 |
| JP | 2004-144831 | 5/2004 |
| JP | 2004-264828 | 9/2004 |
| JP | 2004-363798 | 12/2004 |
| WO | WO 01/60078 | 8/2001 |
| WO | WO 2004/075567 | 9/2004 |
| WO | WO 2004/109634 A1 | 12/2004 |
| WO | WO 2005-004498 A1 | 1/2005 |

OTHER PUBLICATIONS

Enami et al., "Moving Picture Color Artifacts Measured by Using a Pursuit Camera System", IDW/AD, pp. 811-814, (2005).

Enami et al., Monthly Display, pp. 36-42, (2005).

Technical Report, Photal Otsuka Electronics, 12 sheets, (2004).

* cited by examiner

METHOD AND APPARATUS FOR MEASURING MOVING PICTURE RESPONSE CURVE

BACKGROUND OF THE INVENTION

1. Field of the Invention

The present invention relates to a method and apparatus for measuring a moving picture response curve based upon an image of a moving picture on a display to be measured (also referred to as the "target display") that is captured by a moving picture color camera.

2. Description of Related Art

In order to evaluate the blurriness of a moving picture (also referred to as "moving picture blur") on a display, measurements need to be made by moving a camera so as to pursue the moving picture like human eyeballs.

There is a known device (which is referred to as "moving picture camera") for capturing pursued images of a moving picture by rotating a galvanometer scanner provided with a mirror in accordance with the moving speed of the moving picture.

This image capturing device captures pursued images of a picture while the picture is scrolled from left to right. A graph is plotted by converting CCD pixels in the moving direction of the captured image into a time axis as the abscissa, and taking RGB received intensity as the ordinate. The resultant curve is referred to as an MPRC (Moving Picture Response Curve). Based on the edge shape of this MPRC, an MPRT (Moving Picture Response Time) is determined. Objective evaluations of the moving picture blurs can be made using this MPRT.

When a moving picture response curve is obtained as a result of pursuit-capturing a moving picture by a color camera, a coloration phenomenon is observed at the edge part.

It has been known that, in the case of a field sequential drive display for example, in its principles, the light emitting timings for the elements of the respective colors are shifted for each RGB, so that a coloration phenomenon (which is called "color breakup") occurs at the edge part of the displayed moving picture. This is because the display timings are shifted even though the moving picture response time is the same for each color.

In the cases of plasma displays and liquid crystal displays, color blurring occurs because the moving picture response time varies depending on the color of each display element. For example, in a plasma display, due to the differences in response speed and persistence of a phosphor among RGB colors, a bluish tone appears during a black to white transition, and a yellowish tone appears during a white to black transition. For this reason, color breakup occurs at the moving picture edge part.

Thus, in performing a comparative evaluation between displays, it is desired to obtain a moving picture response curve for every lighting color of a target displays.

It is an object of the present invention to provide a method of measuring a moving picture response curve that enables objective and quantitative evaluations of color shifting by decomposing the coloration at an edge of a pursuit-captured moving picture image into the respective component colors.

SUMMARY OF THE INVENTION

Coloration (color breakup) at an edge of a display largely depends on gaps between light emission timings of the display. In order to modify the color shifting at the edge part, information on the light emission timings of the display is necessary. Accordingly, display developers need to identify the MPRC of the display for adjustment.

A method of measuring a moving picture response curve according to the present invention comprises the steps of: scrolling a picture on a display to be measured; pursuit-capturing (pursuing and capturing) the scrolling moving picture by a color camera to obtain a pursuit-captured (pursued and captured) moving picture image; and converting a moving picture response curve using received light intensity data obtained based upon the pursuit-captured moving picture image into a moving picture response curve using emission intensity of display elements of the display to be measured.

In this method, by measuring an edge of a moving picture shown on the display through the moving picture pursuit color camera, the pursued moving picture is measured in the form of a color image. Measuring the moving picture in the form of a color image enables reproduction of an image viewed by human eyes.

In particular, since a moving picture response curve using received light intensity data is converted into a moving picture response curve using emission intensity of display elements of the display to be measured in the present invention, conversion into the moving picture response curve using emission intensity of display elements of the display to be measured can be accomplished irrespective of the characteristics of the color camera. It is therefore possible to make quantitative evaluations of color shifting of the display to be measured.

It is also possible to obtain a moving picture response curve using chromaticity by converting the received light intensity data obtained based on the pursuit-captured moving picture image into chromaticity, and then the moving picture response curve using chromaticity is converted into a moving picture response curve using emission intensity of display elements of the display to be measured.

Further, the moving picture response curve using the received light intensity data obtained based on the pursuit-captured moving picture image may be converted directly into a moving picture response curve using emission intensity of display elements of the display to be measured.

An apparatus for measuring a moving picture response curve is substantially the same invention as the foregoing method of the measuring moving picture response curve according to the present invention.

These and other advantages, features and effects of the present invention will be made apparent by the following description of preferred embodiments with reference to the accompanying drawings.

DETAILED DESCRIPTION OF PREFERRED EMBODIMENTS

Figure 1:
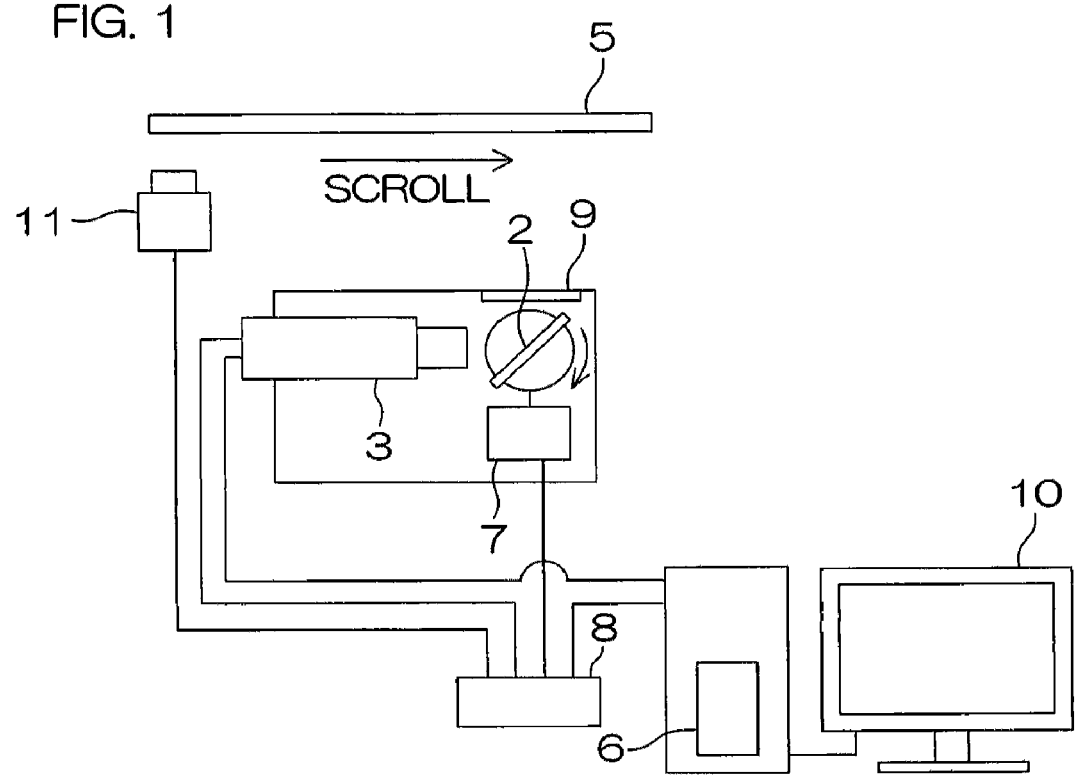
FIG. 1 is a block diagram illustrating a construction including a moving picture pursuit color camera.

FIG. 1 is a block diagram illustrating a construction including a moving picture pursuit color camera.

The moving picture pursuit color camera photographs the screen of a display 5 to be measured, which includes a galvanometer mirror 2, a color camera 3 for photographing the display 5 through the galvanometer mirror 2, a photosensor 11 and a computer control section 6.

The galvanometer mirror 2 includes a permanent magnet disposed rotatably in a magnetic field that is generated by applying electric current to a coil, and is capable of rotating smoothly and rapidly.

A rotation drive signal is transmitted from the computer control section 6 to the galvanometer mirror 2 through a galvanometer mirror drive controller 7.

Instead of providing the galvanometer mirror 2 and the color camera 3 separately, a camera such as a light-weight digital camera may be disposed on a spin base so as to be rotationally driven by a rotational drive motor.

The color camera 3 has a field of view including a part of or the entire display 5.

A luminous efficiency film 9 and the galvanometer mirror 2 are present between the color camera 3 and the display 5 so that the field of view of the color camera 3 can move in one dimensional direction (hereinafter referred to as "scroll direction") on the display 5 in response to the rotation of the galvanometer mirror 2.

The photosensor 11 detects an image moving on the display 5, and the rotation of the galvanometer mirror 2 is triggered to start at the time of detection by the photosensor 11. The photosensor 11 may be spared, and in that case, a trigger signal that states the rotation of the galvanometer mirror 2 may be transmitted from the computer control section 6 to the galvanometer mirror drive controller 7.

Image signals obtained from the color camera 3 are taken into the computer control section 6 through I/O board 8.

A liquid crystal monitor 10 is connected to the computer control section 6.

Figure 2:
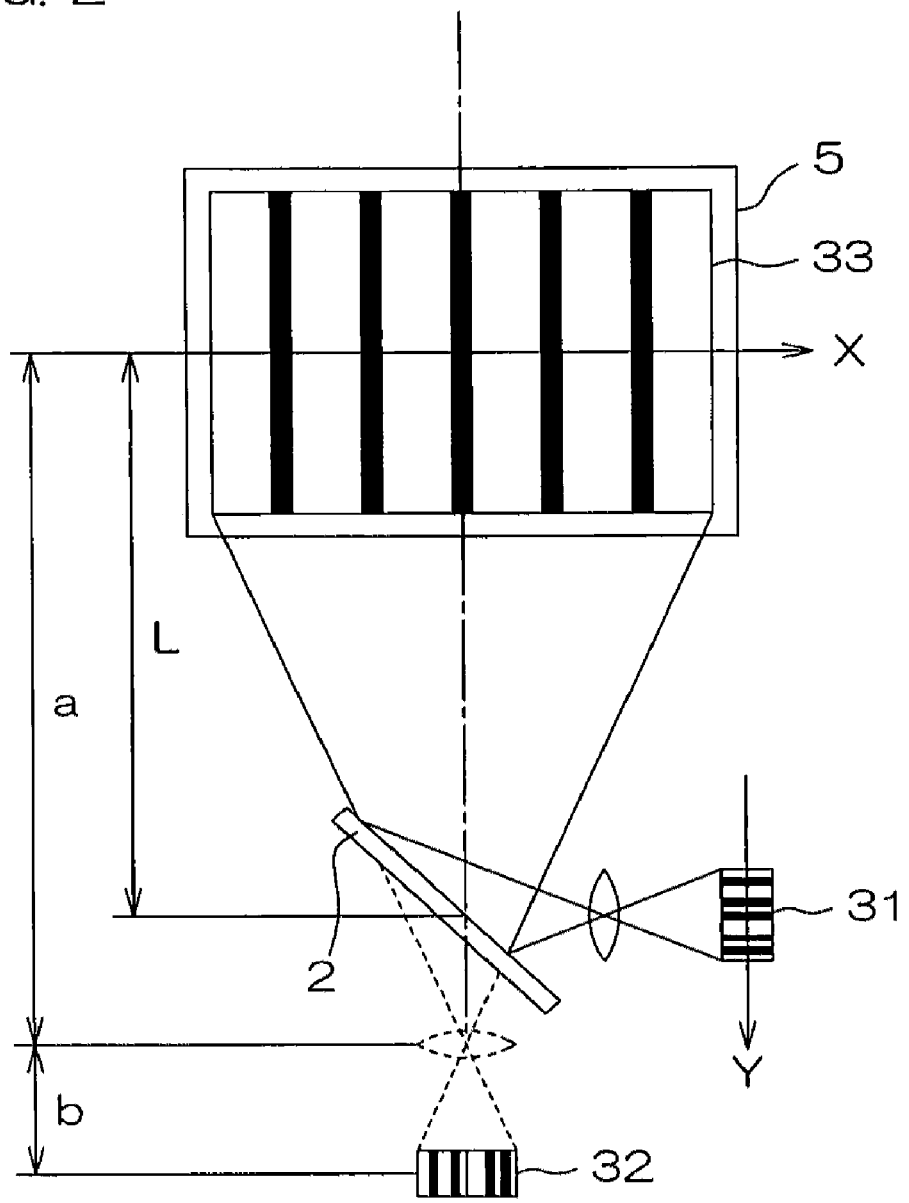
FIG. 2 is a light path diagram illustrating a positional relationship between a detection surface of a camera and a display device to be measured.

FIG. 2 is a light path diagram illustrating the positional relationship between a detection surface 31 of the color camera 3 and the display 5 to be measured. Light rays from the display 5 are reflected by the galvanometer mirror 2 to be incident on the lens of the color camera 3 and detected at the detection surface 31 of the color camera 3. A mirror image 32 of the detection surface 31 of the color camera 3 is drawn in broken lines on the rear side of the galvanometer mirror 2.

Let the distance along the optical path between the display 5 and the galvanometer mirror 2 be represented by L, the distance along the optical path between the display 5 and the lens be represented by a, and the distance along the optical path between the lens and the detection surface 31 be represented by b. When the focal distance f of the lens is given, the relationship between a and b can be determined using the following equation:

$$1/f = 1/a + 1/b$$

Assume that a coordinate of the screen 5 of the display device to be measured in the scrolling direction is X, and that a coordinate in terms of received light intensity of the detector plane 31 of the color camera 3 is Y. Set X0, the origin of X, at the center of the screen of the display to be measured, and set Y0, the origin of Y, at the point corresponding to X0. If the magnification of the lens of the camera 3 is M, $$X = MY$$

is satisfied. The magnification M is expressed using the aforesaid a and b as follows:

$$M = -b/a$$

If the galvanometer mirror 2 is rotated by an angle $\phi$, the corresponding position on the display 5 to be measured deviates with respect to the rotation axis of the galvanometer mirror 2 by an angle of $2\phi$. The coordinate X on the display 5 to be measured that corresponds to the angle $2\phi$ is expressed as follows:

$$X = L \tan 2\phi$$

A modification of the equation above gives the following equation:

$$\Phi = \arctan(X/L)/2$$

The equation [$X = L \tan 2\phi$] is differentiated by time to give the following equation:

$$v = 2L\omega \cos^{-2}(2\phi)$$

where v represents movement speed of the field of view 33 on the display, and $\omega$ represents rotation viewing angular speed of the galvanometer mirror ($\omega = d\phi/dt$). If $\phi$ is a minute angle, $\cos^2(2\phi) \to 1$ can be assumed, therefore the equation above can be expressed as:

$$\omega = v/2L$$

Thus, it can be assumed that the movement speed v of the field of view 33 on the display is proportional to the rotation viewing angular speed $\omega$ of the galvanometer mirror 2.

Now, referring to FIGS. 3(a)-3(c), the principles of a method of evaluating a display will be described.

Suppose that a measurement pattern P for evaluation is a band-like measurement pattern P having a luminance brighter than the background and extends in the scroll direction over a predetermined length. When the galvanometer mirror 2 is rotated at a viewing angular speed corresponding to the movement of the measurement pattern P on the display 5 to be measured, an image of the measurement pattern P is captured by the color camera 3. However, note that the shutter of the color camera 3 is kept open during the rotation of the galvanometer mirror 2.

Figure 3A:
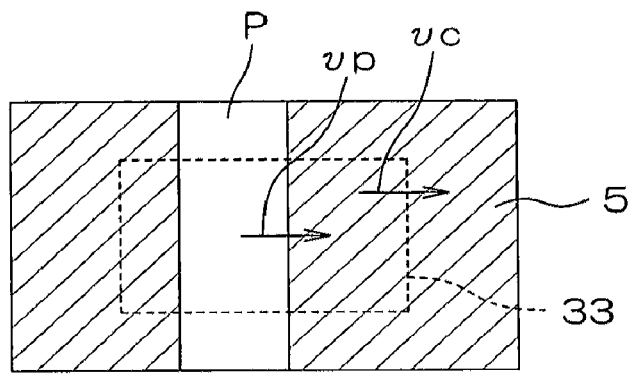
FIG. 3(a) is a view illustrating a measurement pattern P moving at a speed vp indicated by an arrow and a field of view corresponding to a camera detection surface moving at a movement speed vc to pursue thereafter.

FIG. 3(a) is a view illustrating a measurement pattern P moving at a speed vp indicated by an arrow and a field of view 33 corresponding to the camera detection surface 31 moving at a movement speed vc to pursue thereafter.

Figure 3B:
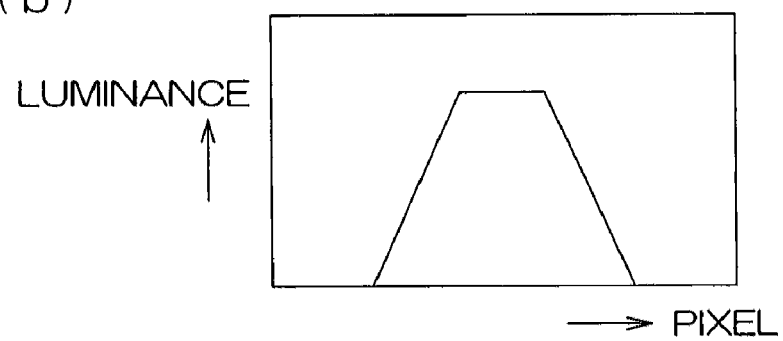
FIG. 3(b) is a graph showing a luminance distribution of a measurement pattern P detected at the camera detection surface.
Figure 3C:
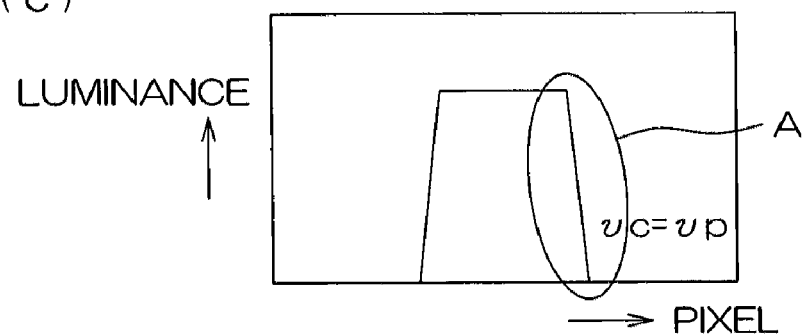
FIG. 3(c) is a graph showing a luminance distribution of the measurement pattern P where an image of the measurement pattern P is captured with a minimum blur.

Receiving light intensity distributions of images detected at the camera detection surface 31 are as shown in FIGS. 3(b) and 3(c). The abscissa in FIG. 3(a), 3(b) represents pixel aligned along the scroll direction, and the ordinate represents received light intensity.

FIG. 3(b) shows an image of the measuring pattern P when the movement speed vc of the field of view 33 does not correspond to the movement speed vp of the measuring pattern P.

When the rotation viewing angular speed of the galvanometer mirror 2 is represented by ω and the rotation viewing angular speed corresponding to the movement speed vp of the measurement pattern P is designated as ω 0, the movement speed vc of the field of view 33 equals to the movement speed vp of the measurement pattern P. FIG. 3(c) shows an image of the measurement pattern P when the movement speed vc of the field of view 33 corresponds to the movement speed vp of the measurement pattern P.

Next, the relationship between a moving picture response curve (MPRC) and a moving picture response time (MPRT) will be described.

The received light intensity distribution of the image of the measurement pattern P detected by the camera detection surface 31 as described above (FIG. 3(b), FIG. 3(c)) is defined as the moving picture response curve MPRC. A coordinate in pixel of the color camera 3 is expressed y as described above.

Simply stated, the moving picture response time (MPRC) is a curve obtained by converting the abscissa y of the moving picture response curve (MPRC) into time axis.

Where the ratio of the number of pixels of the display 5 of the target display to the number of pixels of the camera detection surface 31 corresponding to the display 5 is defined as R, the ratio R is represented by:

$$R = (Pi_{PDP}/Pi_{CCD})M_{OPT}$$

wherein the subscript "PDP" indicates the target display (the target display is not limited to the PDP in the present invention), and the subscript "CCD" indicates the detection surface of the camera (the camera is not limited to the CCD in the present invention) Further, $Pi_{PDP}$ is the pixel pitch of the target display, $Pi_{CCD}$ is the pixel pitch of the detection surface of the color camera 3, and $M_{OPT}$ is the magnification of the camera 3 ($M_{OPT}$ is equal to the magnification M described above).

A relationship between the coordinate $X_{PDP}$ on the target display 5 and the pixel coordinate y of the camera 3 (obtained by converting the coordinate Y on the detection surface of the camera 3 into the number of pixels) is represented by:

$$X_{PDP} = (Pi_{PDP}/R)y$$

The viewing angle θ of the coordinate $X_{PDP}$ is represented by:

$$\theta = \arctan(X_{PDP}/a)$$

where a is the distance between the target display and the lens as described above.

Where a viewing angular speed on the target display 5 is defined as Vθ, a relationship between the viewing angular speed Vθ and a speed (dy/dt) along the pixels on the detection surface of the color camera 3 is represented by:

$$V\theta = d\theta/dt = (1/a)(dX_{PDP}/dt) = (Pi_{PDP}/aR)dy/dt$$

However, this equation is an approximate expression when a is sufficiently great. Where the viewing angular speed Vθ is constant, the number of pixels on the detection surface of the color camera 3 and the time can be correlated with each other by this equation. Where a change in the number of pixels on the detection surface of the color camera 3 is defined as Δy and a change in time is defined as Δt, the following equation is established:

$$\Delta y = (aRV\theta/Pi_{PDP})\Delta t$$

With this equation, the blur of the image on the detection surface of the camera 3 can be converted into a time span. Therefore, a curve resulting from conversion of the abscissa y of the moving picture response curve (MPRC) which is the luminance distribution of the image of the measurement pattern P detected by the camera detection surface 31 into the time t, that is, a moving picture response time (MPRT) can be obtained.

Next, the principles of the process for obtaining a color moving picture response curve according to the present invention are discussed.

A pursuit-captured color moving picture is an image that two dimensionally shows intensity of received light (referred to as "RGB received light intensity" in this specification) that transmits through RGB filters of the installed color camera 3 and is detected by sensor pixel.

The first attempt is to convert the RGB received light intensity of an image detected by the color camera 3 into chromaticity. The conversion equation is as follows:

$$\begin{bmatrix} KXR & KXG & KXB \\ KYR & KYG & KYB \\ KZR & KZG & KZB \end{bmatrix} * \begin{bmatrix} CCDR \\ CCDG \\ CCDB \end{bmatrix} = \begin{bmatrix} CCDX \\ CCDY \\ CCDZ \end{bmatrix} \quad [\text{eq. 1}]$$

where the following [eq. 2] represents "chromaticity correction coefficients" for converting RGB received light intensity of the respective RGB color filters of the color camera 3 into chromaticity.

$$\begin{bmatrix} KXR & KXG & KXB \\ KYR & KYG & KYB \\ KZR & KZG & KZB \end{bmatrix} \quad [\text{eq. 2}]$$

The following [eq. 3] represents intensity values of RGB received light transmitting through the RGB filters of the color camera 3.

$$\begin{bmatrix} CCDR \\ CCDG \\ CCDB \end{bmatrix} \quad [\text{eq. 3}]$$

The following [eq. 4] represents chromaticity obtained from the color camera 3.

$$\begin{bmatrix} CCDX \\ CCDY \\ CCDZ \end{bmatrix} \quad [\text{eq. 4}]$$

According to eq. 1, the chromaticity of the target display (eq. 4) can be determined from the chromaticity correction coefficients (eq. 2) and the RGB received light intensity (eq. 3). While the chromaticity (eq. 4) is expressed using XYZ, it is also possible to convert from XYZ into chromaticity parameters such as Y, x, y or L, u', v' or the like.

The foregoing chromaticity correction coefficients (eq. 2) is required to be determined previously.

Figure 4:
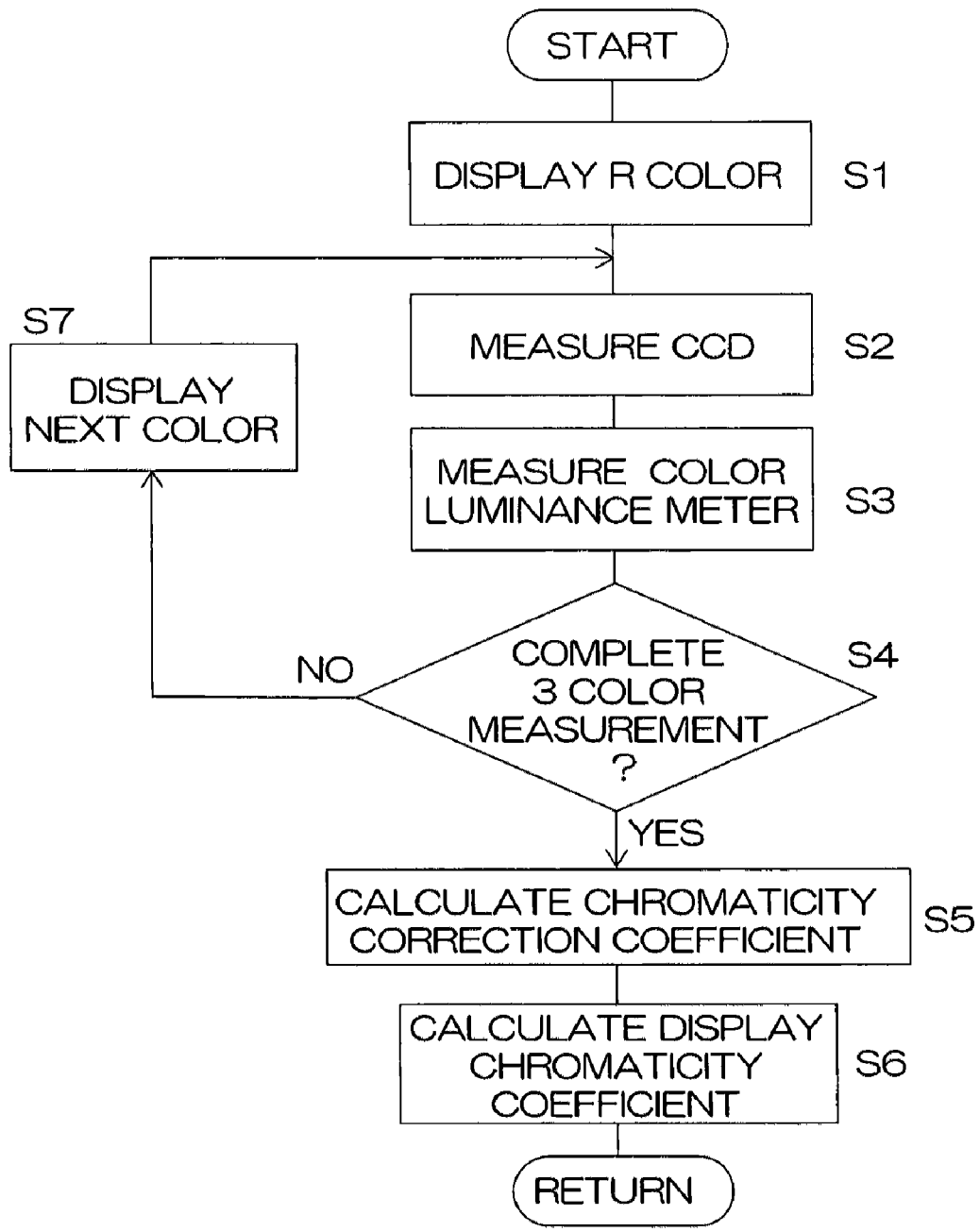
FIG. 4 is a flowchart illustrating a procedure for determining chromaticity correction coefficient and display chromaticity coefficient.

The procedure for determining this chromaticity correction coefficient is now described referring to a flowchart (FIG. 4).

To determine a chromaticity correction coefficient, R color is displayed on a display (Step S1), an RGB received light intensity is measured by a color camera 3 and a measurement value is written as CCDRr, CCDGr, and CCDBr (Step S2).

Then, a chromaticity of X, Y, Z on the R color display are measured by a color luminance meter, and the resulting measurement is written as SXr, SYr, SZr (Step S3).

As well as in G color display on the display, CCD measurement CCDRg, CCDGg, CCDBg, and chromaticity measurement SXg, SYg, SZg measured with the color luminance meter are determined in the same way as above.

As well as in B color display on the display, also CCD measurement CCDRb, CCDGb, CCDBb, and chromaticity measurement SXb, SYb, SZb measured with the color luminance meter are determined in the same way.

As a result, the following simultaneous equations with three unknowns are established:

$$\begin{bmatrix} KXR & KXG & KXB \\ KYR & KYG & KYB \\ KZR & KZG & KZB \end{bmatrix} * \begin{bmatrix} CCDRr \\ CCDGr \\ CCDBr \end{bmatrix} = \begin{bmatrix} SXr \\ SYr \\ SZr \end{bmatrix} \qquad [eq.\ 5]$$

$$\begin{bmatrix} KXR & KXG & KXB \\ KYR & KYG & KYB \\ KZR & KZG & KZB \end{bmatrix} * \begin{bmatrix} CCDRg \\ CCDGg \\ CCDBg \end{bmatrix} = \begin{bmatrix} SXg \\ SYg \\ SZg \end{bmatrix} \qquad [eq.\ 6]$$

$$\begin{bmatrix} KXR & KXG & KXB \\ KYR & KYG & KYB \\ KZR & KZG & KZB \end{bmatrix} * \begin{bmatrix} CCDRb \\ CCDGb \\ CCDBb \end{bmatrix} = \begin{bmatrix} SXb \\ SYb \\ SZb \end{bmatrix} \qquad [eq.\ 7]$$

Solving these three simultaneous equations gives chromaticity correction coefficients (eq. 2) including nine unknowns (Step S5).

At this time, the matrix (eq. 9) that consists of actual measurement values SXr, SYr, SZr, SXg, SYg, SZg, SXb, SYb, SZb for single color display measured by the color luminance meter used in determining the foregoing chromaticity correction coefficient is stored (Step S6). This matrix is referred to as "display chromaticity coefficient".

Figure 5:
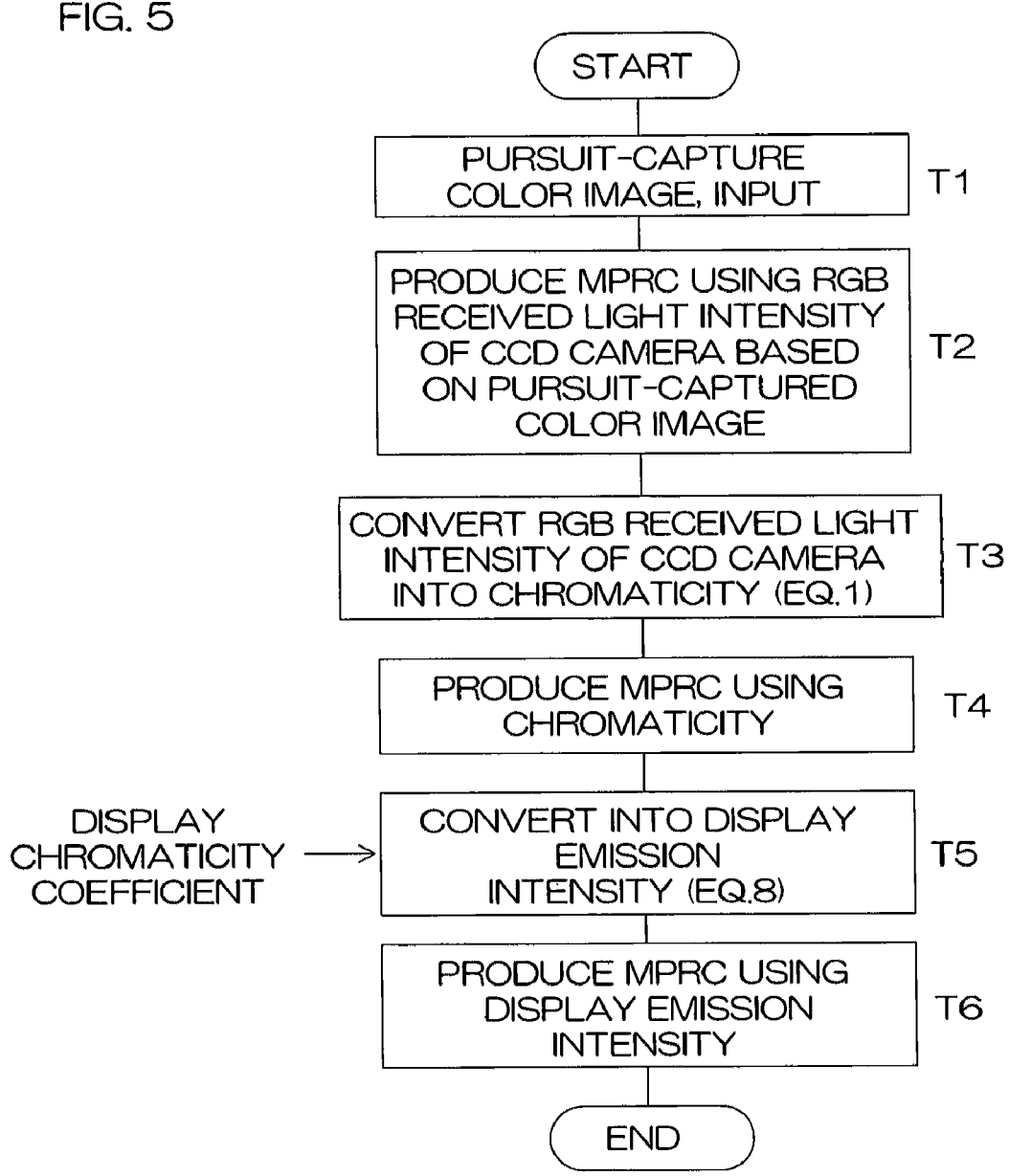
FIG. 5 is a flowchart illustrating a flow of converting a measurement value of a color camera 3 into a color moving picture response curve using chromaticity, and into a color moving picture response curve using emission intensity of the display elements of the display of measuring object.

FIG. 5 is a flowchart illustrating a method for converting the RGB received light intensity measured by the color camera 3 into emission intensity of display elements of the target display.

A scrolling image displayed on the display is pursued by the galvanometer scanner, and the photosensor detects a measurement timing, upon which the color camera 3 pursuit-captures the image. This image is referred to as "pursuit-captured color image". The image data is input into the computer control section 6 (Step T1).

Based on the RGB received light intensity data, color moving picture response curves (FIG. 8) are produced (Step T2).

Subsequently, the RGB received light intensity data are converted into chromaticity using the conversion equation (eq. 1) (Step T3). Thus, the chromaticity CCDX, CCDY, CCDZ can be determined from the measurement value of the RGB received light intensity of the color camera 3.

Color moving picture response curves using the chromaticity are drawn (Step T4).

On the other hand, the chromaticity CCDX, CCDY, CCDZ obtained from the color camera 3 are converted into RGB emission intensity of the target display (Step T5).

Since the transmittance of the color filter provided in the CCD is not adapted for single color of RGB of the display, a color moving picture response curve of a color camera is different from an emission intensity response curve of the display. For example, since Green in a color camera has a wide band for transmissive wavelength, the color includes a mixture of not only G of the display, but also R and B components. For this reason, the emission intensity is different from that of G of the display, which makes it difficult to adjust the timing.

This conversion equation is expressed as follows:

$$\begin{bmatrix} SXr & SXg & SXb \\ SYr & SYg & SYb \\ SZr & SZg & SZb \end{bmatrix} * \begin{bmatrix} DisplayR \\ DisplayG \\ DisplayB \end{bmatrix} = \begin{bmatrix} CCDX \\ CCDY \\ CCDZ \end{bmatrix} \qquad [eq.\ 8]$$

where [eq. 9] expressed as follows represents the foregoing display chromaticity coefficients;

$$\begin{bmatrix} SXr & SXg & SXb \\ SYr & SYg & SYb \\ SZr & SZg & SZb \end{bmatrix} \qquad [eq.\ 9]$$

[eq. 10] expressed as follows represents display emission intensity to be determined;

$$\begin{bmatrix} DisplayR \\ DisplayG \\ DisplayB \end{bmatrix} \qquad [eq.\ 10]$$

and [eq. 11] expressed as follows represents chromaticity calculated using the conversion equation (eq. 1) based on the measurement of the color camera 3.

$$\begin{bmatrix} CCDX \\ CCDY \\ CCDZ \end{bmatrix} \qquad [eq.\ 11]$$

When the conversion equation (eq. 8) is solved, the emission intensity of the RGB display elements (eq. 10) can be determined based on the chromaticity CCDX, CCDY, CCDZ obtained from the color camera 3.

Based on the emission intensity of the display elements of the display, color moving picture response curves (FIG. 10) are produced (Step T6).

Through this procedure, the measurement values of the color camera 3 are converted into emission intensity of the display elements of the target display, by which color moving picture response curves using the emission intensity of the display elements of the target display can be obtained.

Another embodiment of the present invention will be described below.

In the foregoing embodiment, as described referring to the flowchart (FIG. 4), each chromaticity correction coefficient is determined by measuring chromaticity by means of a color luminance meter and based on this, emission intensity of the display is determined.

However, emission intensity of the display can be determined by the following method without using chromaticity.

According to the following method, a color moving picture response curve based on emission intensity of the display elements can be determined without using luminance/chromaticity correction coefficients. Accordingly, it is no longer necessary to determine chromaticity correction coefficient with a color luminance meter.

The relationship between RGB received light intensity measurement values (CCD) of the color camera 3 and RGB emission intensity values of the display (Display) is mathematized using CCDRr, CCDGr, CCDBr, CCDRg, CCDGg, CCDBg, CCDRb, CCDGb, CCDBb (eq. 13) used in eq. 5-eq. 7.

The following simultaneous equations are established:

$$\begin{bmatrix} CCDRr & CCDRg & CCDRb \\ CCDGr & CCDGg & CCDGb \\ CCDBr & CCDBg & CCDBb \end{bmatrix} * \begin{bmatrix} DisplayR \\ DisplayG \\ DisplayB \end{bmatrix} = \begin{bmatrix} CCDR \\ CCDG \\ CCDB \end{bmatrix} \quad [\text{eq. 12}]$$

where [eq. 13] below is referred to as "display intensity correction coefficient" of the color camera 3:

$$\begin{bmatrix} CCDRr & CCDRg & CCDRb \\ CCDGr & CCDGg & CCDGb \\ CCDBr & CCDBg & CCDBb \end{bmatrix} \quad [\text{eq. 13}]$$

These display intensity correction coefficients can be determined by preliminarily measuring the RGB color displays of the target display by the color camera 3 and calculating the RGB components of the color camera 3. The following [eq. 14] represents emission intensity of the display;

$$\begin{bmatrix} DisplayR \\ DisplayG \\ DisplayB \end{bmatrix} \quad [\text{eq. 14}]$$

and [eq. 15] represents measured RGB received light intensity of the color camera 3:

$$\begin{bmatrix} CCDR \\ CCDG \\ CCDB \end{bmatrix} \quad [\text{eq. 15}]$$

Solving the equation (eq. 12) gives emission intensity (eq. 14) of the display. Accordingly, emission intensity of the display can be determined directly without using chromaticity.

Next, determining chromaticity (CCD) of the display by calculating the product of emission intensity of the display (Display) and chromaticity of RGB display colors of the display is attempted.

$$\begin{bmatrix} SXr & SXg & SXb \\ SYr & SYg & SYb \\ SZr & SZg & SZb \end{bmatrix} * \begin{bmatrix} DisplayR \\ DisplayG \\ DisplayB \end{bmatrix} = \begin{bmatrix} CCDX \\ CCDY \\ CCDZ \end{bmatrix} \quad [\text{eq. 16}]$$

where [eq. 17] below represents chromaticity values measured on the respective display colors of the display; [eq. 18] represents emission intensity of the display; and [eq. 19] represents chromaticity obtained from the color camera 3.

$$\begin{bmatrix} SXr & SXg & SXb \\ SYr & SYg & SYb \\ SZr & SZg & SZb \end{bmatrix} \quad [\text{eq. 17}]$$

$$\begin{bmatrix} DisplayR \\ DisplayG \\ DisplayB \end{bmatrix} \quad [\text{eq. 18}]$$

$$\begin{bmatrix} CCDX \\ CCDY \\ CCDZ \end{bmatrix} \quad [\text{eq. 19}]$$

Through this procedure, chromaticity can also be obtained.

Figure 6:
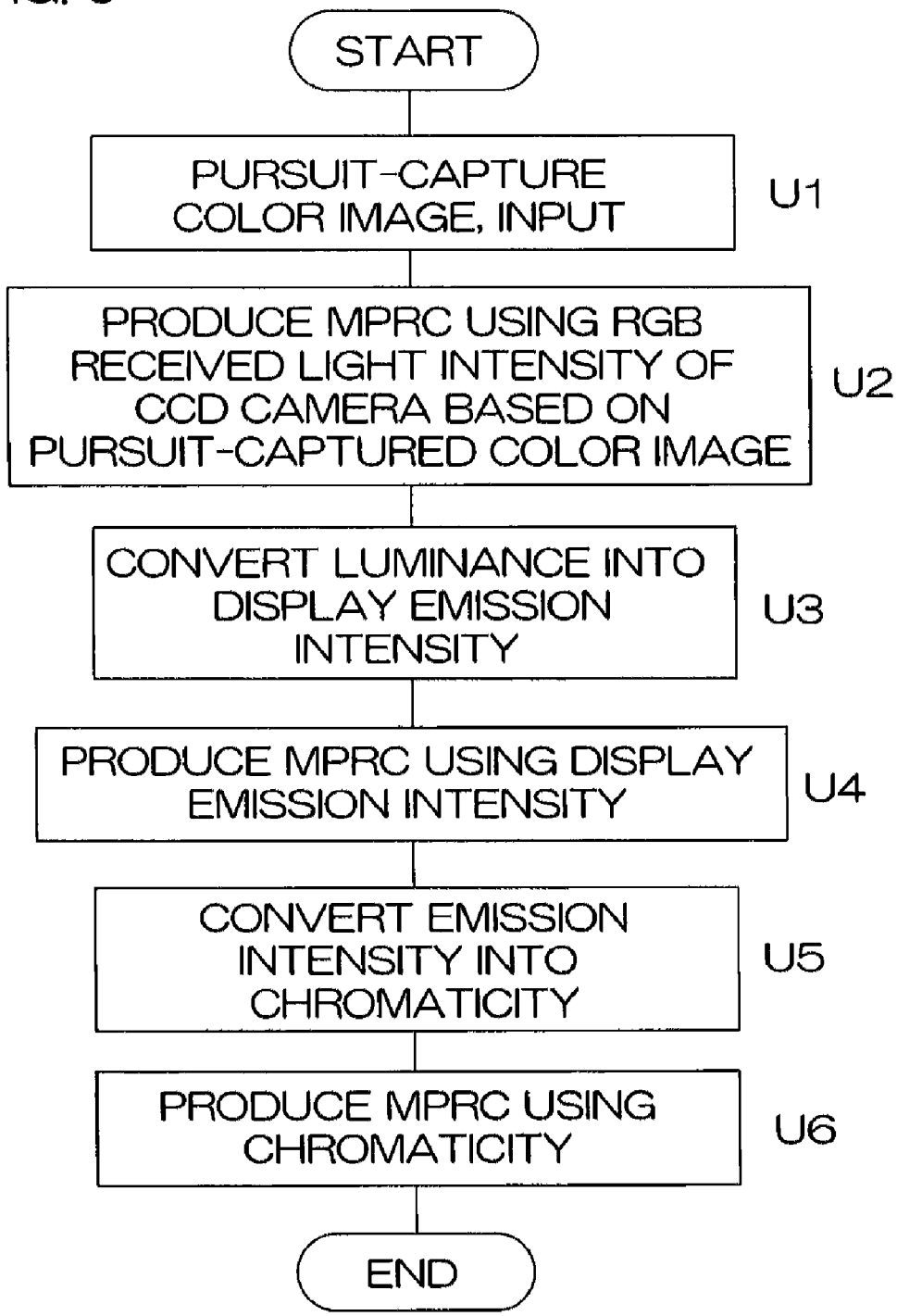
FIG. 6 is a flowchart illustrating a flow of conversion from measurement data according to another embodiment.

The flow of the foregoing conversion from measurement data is described referring to a flowchart (FIG. 6) as follows.

A scrolling image displayed on the display is pursued by the galvanometer scanner, and the photosensor detects a measurement timing, upon which the color camera 3 captures the image. The image is referred to as "pursuit-captured color image". The image data is input into the computer control section 6 (Step U1).

RGB received light intensity (eq. 15) is measured by the color camera 3 (Step U2).

Emission intensity of the display (eq. 14) are determined using the conversion equation (eq. 12)(Step U3).

Color moving picture response curves are calculated based on the emission intensity of the display elements (Step U4).

Subsequently, chromaticity values (CCD) of the display are determined using the conversion equation (eq. 16) (Step U5).

Color moving picture response curves are drawn using chromaticity CCDX, CCDY, CCDZ (Step U6).

EXAMPLE

A pursuit-captured color moving picture of a moving edge was measured by a moving picture pursuit color camera. The measurement conditions were as follows:
Sample: field sequential drive display
Edge image scroll speed: 8 pixel/frame
Camera shutter speed: 1/20 sec
Image signal: 720P (progressive)

Figure 7:
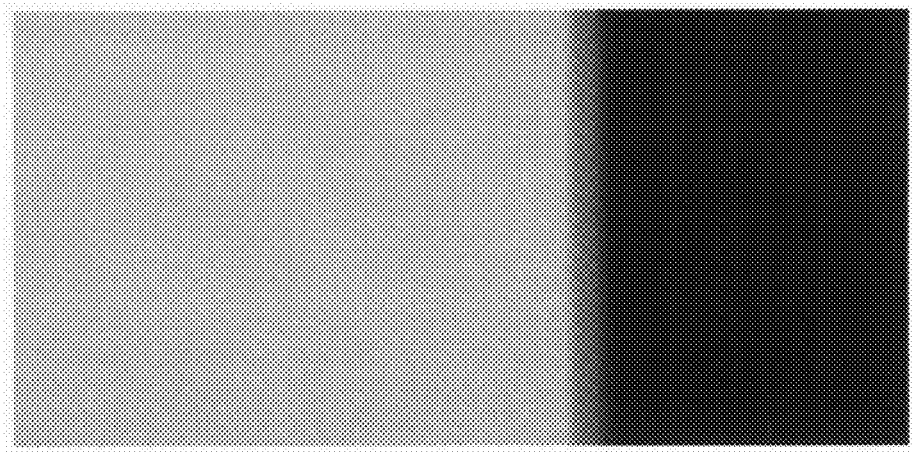
FIG. 7 shows an image of a pursued and captured (referred to as "pursuit-captured") moving picture measured by the color camera 3.

The measured pursuit-captured image is shown in FIG. 7.

Figure 8:
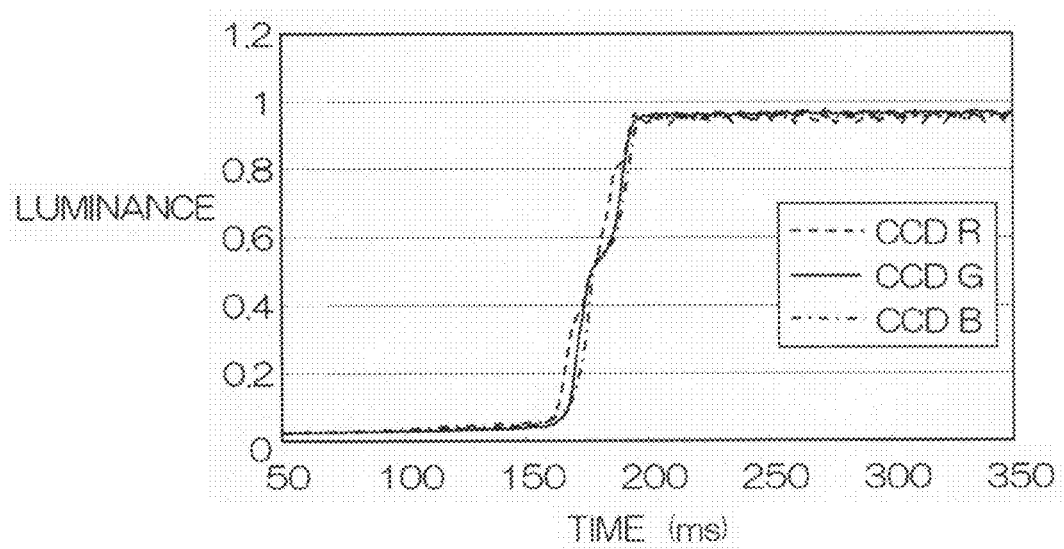
FIG. 8 is a graph showing color moving picture response curves using RGB received light intensity of the color camera 3.

Changes in RGB received light intensity in the edge part can be seen by this pursuit-captured color moving picture image. In other words, the abscissa is converted into time axis and the ordinate represents RGB received light intensity so that color moving picture response curves can be drawn. FIG. 8 shows color moving picture response curves of sensitivity of the color camera 3 obtained in such a way.

Since these data are based on the light receiving sensitivity of the color camera 3, they are different from RGB display components of emission intensity of the display.

Therefore, conversion into chromaticity is performed. Multiplying preliminarily determined chromaticity correction coefficients by RGB received light intensities of the color camera 3 (eq. 1) gives chromaticities XYZ.

The following is an example where chromaticities XYZ is converted into brightness Y and chromaticities u, v. Here, Y indicates Y in the chromaticities X, Y, Z. Chromaticities u' and v' can be determined by the following equations.

$$u' = 4X/(X + 15Y + Z)$$

$$v' = 9X/((X + 15Y + Z)$$

Figure 9:
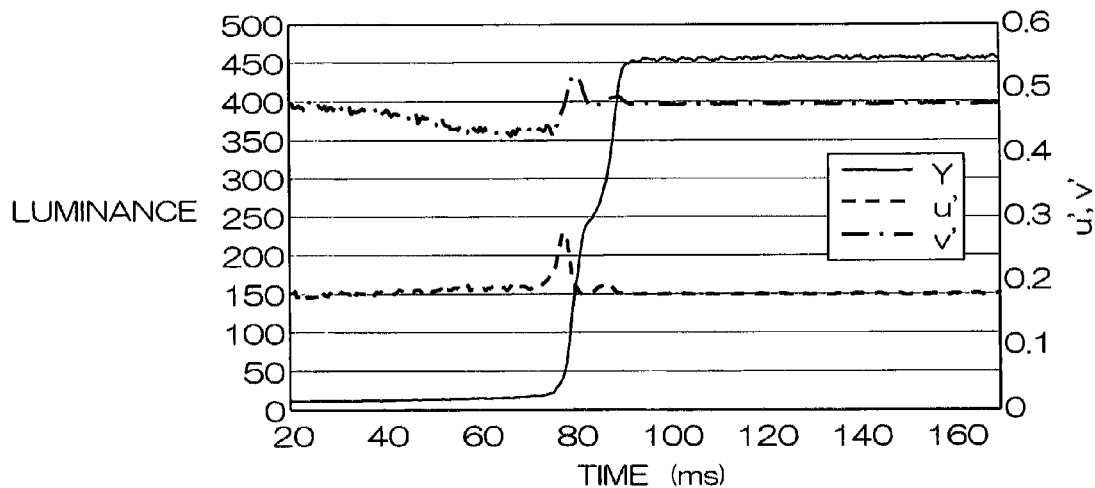
FIG. 9 is a graph showing color moving picture response curves using chromaticity.

FIG. 9 is a graph showing color moving picture response curves using chromaticities Y u', v'.

Since the color moving picture response curves using chromaticities Y u', v' show the luminance Y/chromaticities u', v' of the moving picture, coloration degrees of the edge part or the like can be evaluated quantitatively. However, since the filter of a color camera has the camera-specific transmittance and varies depending on the camera, the intensity also varies depending on the color camera, and therefore comparisons between individual cameras are impossible by color moving picture response curves of color cameras. Therefore, conversions into received light intensity/chromaticity facilitate comparative inspections between different measurement devices.

Color moving picture response curves of chromaticities u', v' with flat profiles show that there is no color blur in the edge part of the moving picture. In this graph, peaks are observed in u', v' in the vicinity of 80 msec. This shows that the moving picture on the display has color breakup in its edge part.

Subsequently, using display chromaticity coefficients (FIG. 9), RGB emission intensity of the display are determined from the chromaticities XYZ.

Figure 10:
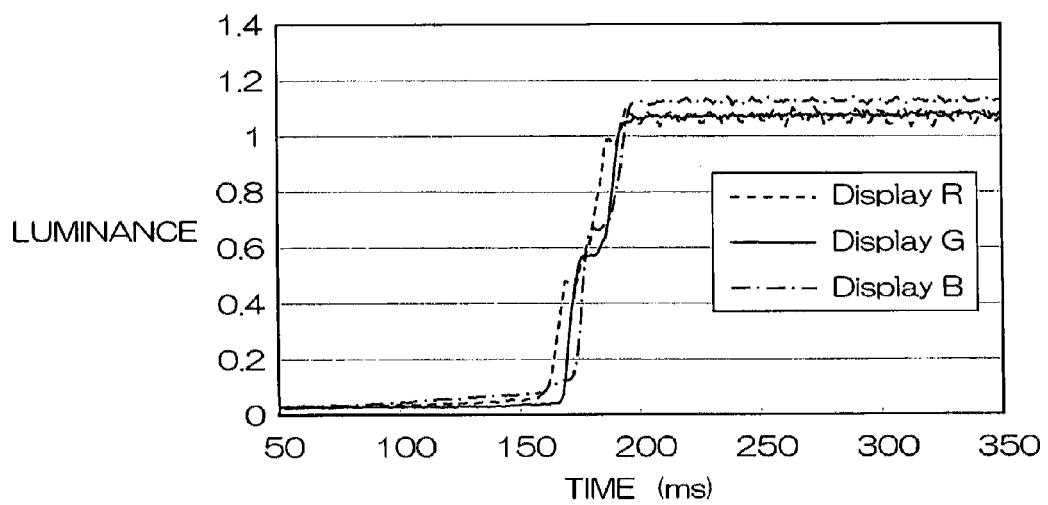
FIG. 10 is a graph showing moving color moving picture response curves using emission intensity of the display.

FIG. 10 shows color moving picture response curves based on transmitted light intensities of the display obtained in the foregoing way.

The color breakup of the edge part of the moving picture is caused by difference in response of the transmitted light intensities of the display. Accordingly, adjustments can be made by checking the response curves of the transmitted light intensities of the display for improving the display.

The invention claimed is:

1. A method of generating a moving picture response curve of a display device, comprising the steps of:
    displaying a pattern on the display device, the pattern moving at a scroll velocity;
    moving an optical system at a camera velocity to direct first light, emitted from the display device, to a color camera, the camera velocity being based on the scroll velocity so as to obtain in the camera a still image of the pattern;
    generating light intensity data from the obtained image;
    determining camera correction parameters based on second light emitted from the display device;
    converting the light intensity data into emission intensity data of the display device based on the camera correction parameters; and
    generating a moving picture response curve using the emission intensity data.

2. The method of claim 1, wherein converting the light intensity data into the emission intensity data comprises:
    converting the light intensity data into chromaticity data based on the camera correction parameters; and
    converting the chromaticity data into the emission intensity data.

3. The method of claim 1, wherein the light intensity data, the chromaticity data, and the emission intensity data comprise time sequence data.

4. The method of claim 3, wherein:
    the display device comprises a plurality of color channels, and
    the emission intensity data comprise emission data for the color channels.

5. The method of claim 4, further comprising:
    converting the chromaticity data to the emission intensity data using a plurality of display chromaticity coefficients of the display device.

6. The method of claim 5, further comprising:
    generating the second light using the color channels, the second light being single-color light;
    generating a plurality of single-color images by capturing the single-color light using the camera; and
    determining the camera correction parameters using the single-color images.

7. The method of claim 6, further comprising:
    generating single-color light intensity values from the single-color images;
    measuring, using a color luminance meter, luminance values of the single-color light from the display device; and
    determining the camera correction parameters based on the single-color intensity values and the luminance values.

8. The method of claim 7, further comprising:
    determining the display chromaticity coefficients of the display device based on the luminance values.

9. The method of claim 8, further comprising:
    organizing the display chromaticity coefficients and the camera correction parameters into matrix form, respectively.

10. The method of claim 9, further comprising:
    converting the light intensity data into the chromaticity data by multiplying the light intensity data with the chromaticity correction coefficients.

11. The method of claim 4, wherein the color channels comprise a red channel, a green channel, and a blue channel.

12. The method of claim 11, further comprising generating the moving picture response curves for the color channels of the display device.

13. The method of claim 1, further comprising:
    converting the light intensity data into the emission intensity data by solving a plurality of linear equations for the emission intensity data.

14. An apparatus for generating a moving picture response curve of a display device, comprising:
    an optical system for pursuit-capturing an image of a moving pattern scrolling on a display device, the system including a color camera for generating light intensity data from the image; and
    a processor configured to:
        determine camera correction parameters based on light emitted from the display device;
        convert the light intensity data into emission intensity data of the display device based on the camera correction parameters; and
        generate a moving picture response curve based on the emission intensity data.

15. The apparatus of claim 14, further comprising a mirror configured to direct the light emitted from the display device to the camera.

16. The apparatus of claim 15, wherein the mirror further comprises a rotatable mount configured to rotate the mirror in synchronism with the moving pattern.

17. The apparatus of claim 16, further comprising a photosensor configured to detect a movement of the moving pattern and supply a rotation signal to the rotatable mount.

18. The apparatus of claim 16, wherein the processor supplies, in response to a movement of the moving pattern, a rotation signal to the rotatable means.

19. The apparatus of claim 14, wherein the processor is further configured to:
    convert the light intensity data into chromaticity data based on the camera correction parameters; and
    convert the chromaticity data into the emission intensity data based on a plurality of display chromaticity coefficients.

20. The apparatus of claim 19, further comprising a color luminance meter configured to measure luminance values of single-color light emitted by the display device, wherein:
    the camera is further configured to capture a plurality of single-color images in response to the single-color light; and
    the processor is further configured to:
        generate single-color light intensity values from the single-color images;
        determine the display chromaticity coefficients of the display device based on the luminance values; and
        determine the camera correction parameters based on the single-color intensity values and the luminance values.

\* \* \* \* \*